Sept. 30, 1947.                L. A. SMITH                2,428,099
                              CUTTING TOOL
                      Original Filed Feb. 18, 1944
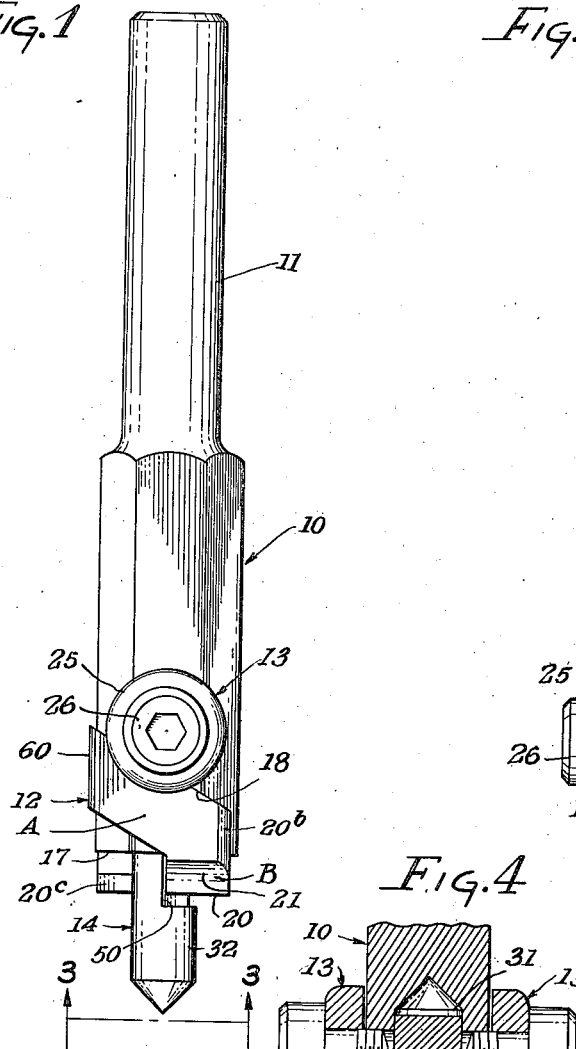
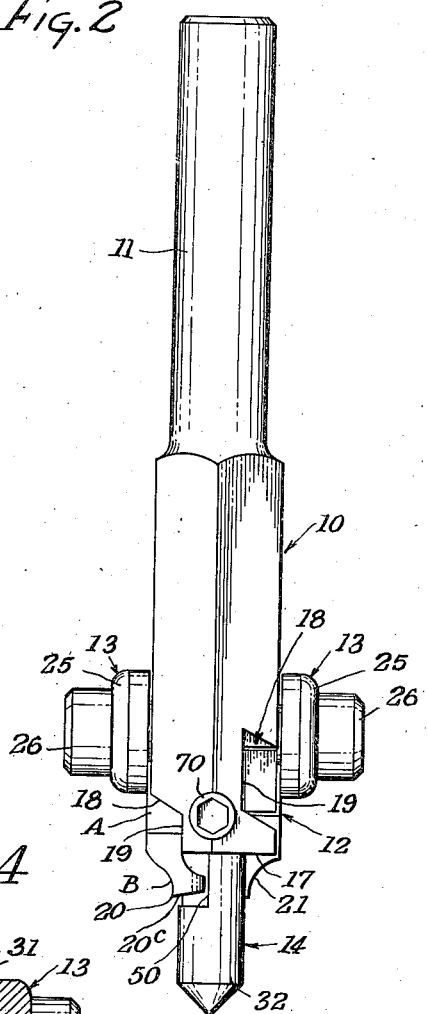
INVENTOR.
LAWSON A. SMITH
BY
ATTORNEY Patented Sept. 30, 1947

2,428,099

UNITED STATES PATENT OFFICE 2,428,099

CUTTING TOOL

Lawson Allen Smith, Los Angeles, Calif., assignor to Robert H. Clark, Los Angeles, Calif.

Original application February 18, 1944, Serial No. 522,901. Divided and this application January 19, 1945, Serial No. 573,597

11 Claims. (Cl. 77—58)

This invention has to do with a cutting tool and has particular reference to that type of tool used in performing the operation commonly known as spot facing or counterboring.

In the manufacture of various machine parts or devices it is frequently desired to finish or machine a surface in the immediate vicinity of or around a bore. Devices known as counterbores or spot lacers are used for this purpose, it being common to provide such devices with pilots that enter the bore and with blades that act to cut the surface desired. A common difficulty with such tools is that a burr is formed at the point of joinder of the surface and hole, with the result that the tool becomes stuck or fails to operate smoothly. With most tools of the general character referred to it is not at all uncommon for the pilots to become stuck, causing considerable inconvenience and often damage.

It is a general object of this invention to provide a tool with a form of cutter that will effectively spot face or counterbore. The tool of the present invention involves a cutter with a shank portion that can be angularly disposed to be advantageously held by the body of the tool while the tip portion is pitched in any desired manner, say for instance, at right angles to the axis of the tool, to perform the desired cut, the tip portion being in the form of a depending extension on the shank suitable to be dressed in any desired manner.

Another object of the present invention is to provide an improved means for retaining the pilot in the tool. In the preferred form of the invention the blades cooperate with the stem of the pilot to retain the pilot in the body.

This application is filed as a division of my co-pending application entitled "Cutting tool," filed February 18, 1944, Serial No. 522,901.

The various objects and features of my invention will be fully understood from the following detailed description of a typical preferred form and application of the invention, throughout which description reference is made to the accompanying drawings, in which:

Fig. 1 is a side elevation of a tool embodying the present invention, being a view taken in a direction to show the forward or leading side of one of the blades of the tool. Fig. 2 is a view similar to Fig. 1 taken with the tool rotated through 90°. Fig. 3 is a bottom end view of the tool of the present invention, being a view taken as indicated by line 3—3 on Fig. 1, and Fig. 4 is a central, sectional view of the tool showing the manner in which the blades act to retain the shank of the pilot in the body.

The tool of the present invention embodies, generally, a body 10, a shank 11 on the body for mounting it in a machine of suitable character, blades 12 carried by the body to project from the lower end thereof, means 13 operable to clamp the blades in the desired position on the body, and a pilot 14 carried by the body to project from the lower end thereof and to cooperate with blades 12 to make the desired cut. A feature of the construction provided by my present invention is the elimination of separate or independent means for retaining the pilot 14 in position.

In the usual tool of the character under consideration a set screw, screw thread, or other mechanical means is provided to retain the pilot or to retain a stem carrying the pilot, so that the pilot or its stem will not become detached from the body 10. By my present invention I eliminate entirely any special means for this purpose but effectively retain the pilot in the desired position relative to the body by providing for cooperative engagement between the blades or a blade and the body. In accordance with the broader principles of the invention either one or both of the blades 12 engages the stem or upper portion of the pilot, to effectively retain it in position.

The body 10 is preferably an elongate member proportioned to firmly carry the blades 12, the means 13 and the pilot 14. In the preferred form of the invention the body is hexagonal in cross-sectional configuration, as shown in the drawings.

The shank 11 is preferably formed integral with the body to project from the upper end thereof and is proportioned, shaped and finished to be accommodated in a suitable tool or operating machine. In the particular form of the invention illustrated the shank is shown round in cross section and of uniform diameter, to be engaged in a suitable chuck, or the like.

The invention provides one or more blades 12 to be carried by the body 10 to project from the lower end thereof, the lower end portion of each blade being dressed or sharpened to have the desired cutting action. In the preferred form of the invention the lower end 17 of the body is flat so that it lies in a plane transverse to the longitudinal axis of the tool, and the cutters are carried by the body to project from the lower end 17 thereof.

In practice I provide the tool with two blades 12 and I locate the blades diametrically opposite each other, or at opposite sides of the body 10. In the general arrangement clearly illustrated in the drawings, the body 10 has channels 18 cut in diametrically opposite sides to carry the blades 12. The channels are of sufficient width to slidably pass the blades and are made sufficiently deep so that the blades are well seated in the body to be firmly supported thereby. By making the channels deep the bottoms 19 of the channels are considerably wider, or of greater area, than they would be if the channels were shallow, this being due to the fact that the body is hexagonal in cross-section, and the surfaces 19 become wider as the channels are deeper.

In the preferred form of the invention I pitch or incline the channels 18 so the blades are carried to extend downward and outward from the lower end 17 of the body, that is, the channels are angularly disposed or pitched to carry the shank portions A of the cutters so that they extend down and out, while the blade portions B of the cutters depend from the lower ends of the shanks to project below the end 17 of the body in the desired manner. I not only form the blades to depend from the shanks, but I offset them rearwardly, as shown in the drawings, particularly Fig. 2, so that they fit into the notched pilot in a most advantageous manner. By rearwardly offsetting the blades the body can be of substantial size and the blades spaced a considerable distance apart, and yet I am able to employ a pilot of small diameter and at the same time have the cutting edges of the blades overlap the surface of the pilot. It is to be understood that the channels are pitched to correspond to each other, so that the blades or their shanks are carried at corresponding angles, and that the angles are such that the channels extend a considerable distance upward in the body from the lower end thereof to give the shanks of the blades adequate support.

The shank portions A of the blades are preferably rectangular in cross-section to occupy the channels in the manner illustrated in the drawings, and the upper ends 60 of the shanks are cut off parallel with the axis of the tool.

The blade portion B of each cutter depends from the outer or lower end portion of the shank and it is shaped and proportioned to best suit the work to be performed. A feature of the present invention is the provision of a distinct blade portion on the lower or outer end of the shank, which blade portion depends from the shank and is adapted to be dressed or finished in any desired manner to accomplish any sort of cutting action. In the drawings I show a blade designed to spot face and, consequently, the blade is shaped so that it is disposed at right angles to the axis of the tool and has a horizontally disposed cutting edge 20. The outer side or edge portion 20ᵃ of the blade is preferably dressed or rounded to give desired clearance, and in corresponding manner the lower end 20ᵇ of the blade shank is correspondingly dressed or rounded, as clearly shown in the drawings. It is to be understood, of course, that suitable clearance is provided immediately behind the cutting edge 20 of each blade by suitably dressing the bottom 20ᶜ of the blade. In practice the blade may be dressed so that its cutting edge 20 is disposed at any suitable angle relative to the axis of the tool. In the particular tool illustrated the edge extends tangentially to a circle concentric with the axis of the tool, to give the tool a shearing action desired for the particular work to be performed. It is to be understood that the front face 21 of the blade can be suitably dressed or shaped to provide chip clearance or to direct cuttings so that the tool does not become clogged in the course of operation.

The means 13 provided for holding the blades in place in the channels 18 of the body may be any suitable means that will serve this function. In the construction illustrated I provide clamp plates 25 to engage the outer sides of the shanks A and I provide cap screws 26 to extend through the plates and thread into tapped openings in the body 10. The plates are washer-like members that overlap or overhang the shanks of the cutters while the cap screws are preferably of the hollow head type.

The pilot 14 may be of any desired construction, that is, it may be a built up structure such as is illustrated in the parent application hereinabove referred to, or it may be a simple guide pin, such as is shown in the drawings. In accordance with my present invention the stem portion 30 of the pilot slidably fits into a bore 31 provided in the center of the body from its lower end 17, while the tip or head 32 of the pilot is of any desired diameter and projects below the end 17 of the body to enter a guide hole or bore in which the tool is operated. In the particular case shown in the drawings the stem portion 30 and working portion 32 of the pilot are of the same diameter. In accordance with my present invention the pilot is retained in the bore 31 provided in the body through engagement by one or both of the blades 12. In the particular arrangement illustrated the pilot is held by both blades. By my present invention I proportion the grooves 18 which carry the shanks A of the cutters so that they extend deep into the body or, at least, deep enough into the body to intersect the bore 31, so that when the cutters are seated in the grooves or channels 18 the inner sides of the shank portions A are in or intersect the bore. In order that the parts may properly cooperate and that the stem of the pilot be held by the blades I provide recesses or notches 40 in the sides of the stem 30 to accommodate the shanks A of the blades. In practice the parts can be proportioned so that the recesses 40 are shallow, that is, so that there is but slight overlap or interengagement of the cutters with the pilot, as it is merely necessary that there be some engagement between these parts in order to effect proper retention of the pilot. In some cases the arrangement may be such that the cutters have pressure engagement with the stem of the pilot without being actually recessed therein.

A feature of the construction that I have provided is that the cutting edges 20 of the cutter blades B overlap the surface of the head 32 of the pilot. To accomplish this the head 32 of the pilot is notched at 50 and the notches 50 extend far enough below the end 17 of the body so that the blade portions B of the cutters nest or fit into them, that is, the inner end portions of the blades fit into the notches 50. The notches 50 are preferably made large enough so that there is some room for movement or adjustment of the blades therein.

Where the construction involves two diametrically opposite blades 12 there are two diametrically opposite notches 40 in the stem 30 of the pilot and, likewise, two diametrically opposite notches 50 in the part 32 of the pilot to accommodate the blade portions of the two cutters.

In the drawings I have shown a set screw 70 carried by the body to engage the stem 30 of the pilot. However, in practice I prefer to eliminate this element entirely since the direct engagement of the cutters with the stem of the pilot is a most effective means for holding the pilot and any supplemental means, such as the set screw 70, is entirely unnecessary.

From the foregoing description it will be apparent that I have provided a cutter that is extremely simple and inexpensive of manufacture and which provides cutters 12 having shanks applied to the body 10 in a most advantageous manner, at the same time having blade parts B shaped and disposed to cut in a most advantageous manner, in fact, to cut any form of cut that may be desired. It is also to be noted that when the cutters 12 are secured to the body 10 by the means 13 they intersect the bore 31 that carries the stem of the pilot, so that parts of the shanks A engage in the notches 40 of the pilot and thus effectively and positively retain the stem 30 of the pilot in the bore 31.

It is to be understood that the construction that I have provided permits of cutters with various shaped blades being used, and also that pilots with heads 32 of various sizes can be employed. In any particular tool the shank or stem portion of the pilot provided to fit the bore 31 will be of a size to properly fit the bore and will be provided with notches 40 to accommodate the cutters which serve not only as cutters, but as the means for retaining the shank or stem of the pilot in place in the body.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A tool of the character described including, a body having a central socket in its lower end and having a channel laterally offset from the axis of the socket, a cutter retained in the channel to have a cutting edge located beyond the lower end of the body, and a pilot carried by the body with a surface to fit a hole and continuing from a point above said edge to a point below said edge, the pilot including a stem carried in the socket of the body and a head on the stem having the said surface, the cutter being carried by the body to engage a side notch in the stem to hold the stem tight in the body.

2. A tool of the character described including a body an angularly disposed channel in one side with a bottom in a plane tangent and parallel to the body and pitched to extend lengthwise and sidewise of the body to open at the lower end of the body, a cutter carried by the channel and having a rearwardly offset lower cutting end beyond the lower end of the body with a forwardly facing cutting edge, and a pilot carried by the body overlapping the edge.

3. A tool of the character described including a body having a central socket and a side channel, a cutter carried by the channel and having a rearwardly offset lower cutting end with a forwardly facing cutting edge, and a pilot carried by the socket overlapping the edge, the pilot having a notch confined to its side and receiving the inner end portion of said edge.

4. A tool of the character described including, a body having a central socket and a side channel in it having a bottom in a plane offset from the axis of the body and intersecting the socket, a cutter retained in the channel with one side bearing on the bottom of the channel and having a cutting edge extending at substantially right angles to the longitudinal axis of the tool and located beyond the lower end of the body, and a pilot carried by the body with an outer surface concentric with the axis of the tool to fit a hole and continuing from a point above said edge to a point below said edge, the said side of the cutter engaging one side of the pilot to retain it in the socket of the body.

5. A tool of the character described including, a body having a tool in it, a cutter carried by the channel to have a cutting edge extending at substantially right angles to the longitudinal axis of the tool and located beyond the lower end of the body, and a pilot carried by the body with an outer surface concentric with the axis of the tool to fit a hole and continuing from a point above said edge to a point below said edge, there being a side notch in the pilot so that the inner end portion of said edge is spaced from and overlaps said surface, there being a second side notch in the pilot receiving the cutter so the pilot is retained by the cutter.

6. A tool of the character described including, a body having a side channel in it remote from the center of the body and extending lengthwise and sidewise of the body to its lower end, a cutter carried by the channel to have a cutting edge disposed tangent to a circle concentric with the central axis of the tool and located beyond the lower end of the body, and a pilot carried by the body with a curved surface concentric with the central axis of the tool and of larger diameter than said circle to fit a hole and continuing from a point above said edge to a point below said edge, the body having a central bore receiving the pilot and intersecting the channel so the cutter engages and retains the pilot.

7. A tool of the character described including a body having a channel confined to one side thereof, a cutter carried by the channel and having a rearwardly offset lower cutting end with a forwardly facing cutting edge, means clamping the cutter toward the center of the body to hold it in the channel, and a pilot carried by a central bore in the body that intersects the channel and overlapping the edge, the cutter engaging the pilot in the bore to retain the pilot therein.

8. A tool of the character described including, a body having a channel in it and confined to one side thereof, a cutter carried by the channel to have a cutting edge located beyond the lower end of the body, clamp means carried by said side of the body engaging the outer side of the cutter and holding the cutter in the channel, and a pilot carried by the body with a surface to fit a hole and continuing from a point above said edge to a point below said edge, the pilot including a stem carried in a central socket in the body and a head on the stem having the said surface, the inner side of the cutter engaging one side of the stem to hold the stem in the socket in the body.

9. A tool of the character described including, a body having a channel in it confined to one side thereof, a cutter carried by the channel to have a cutting edge located beyond the lower end of the body, clamp means carried by said side of the body engaging the outer side of the cutter and a pilot carried by the body with a surface to fit a hole and continuing from a point above said edge to a point below said edge, the pilot including stem carried in a central socket in the body and a head on the stem having the said surface, the stem having a side notch and the cutter being carried by the body to engage the notch in the stem to hold the stem in the body.

10. A tool of the character described including a body with channels confined to opposite sides thereof, and a central bore in it from its lower end and intersecting the channels, a pilot having a stem in the bore, cutters carried in the channels to engage the pilot at opposite sides and having cutting edges below the end of the body, and clamp means retaining the cutters in the channels and in engagement with the pilot.

11. A tool of the character described including a body with outwardly opening channels in opposite sides thereof, and a central bore in it from its lower end and intersecting the channels, a pilot having a stem in the bore with notches in opposite sides, and cutters carried in the channels to engage in the notches of the stem and hold the pilot and having cutting edges below the end of the body.

LAWSON ALLEN SMITH.

REFERENCES CITED

The following references are of record in the file of this patent:

UNITED STATES PATENTS

| Number | Name | Date |
|---|---|---|
| 967,789 | LeBaron | Aug. 16, 1910 |
| 1,240,701 | Geitner | Sept. 18, 1917 |
| 1,299,856 | Nethercutt | Apr. 8, 1919 |
| 1,561,463 | DeRochemont | Nov. 17, 1925 |
| 1,502,652 | Babcock | July 29, 1924 |
| 1,622,094 | Decker | Mar. 22, 1927 |
| 2,057,769 | Dowling et al. | Oct. 20, 1936 |